(12) United States Patent
Irmscher et al.

(10) Patent No.: US 8,624,737 B2
(45) Date of Patent: *Jan. 7, 2014

(54) CHARGING MERCHANDISE ITEMS

(71) Applicant: Checkpoint Systems, Inc., Thorofare, NJ (US)

(72) Inventors: Julia Irmscher, Zwingenberg (DE); Michael Rapp, Modautal (DE); Rainer Brenner, Teningen-Kondringen (DE)

(73) Assignee: Checkpoint Systems, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/659,223

(22) Filed: Oct. 24, 2012

(65) Prior Publication Data

US 2013/0049961 A1    Feb. 28, 2013

Related U.S. Application Data

(63) Continuation of application No. 13/276,396, filed on Oct. 19, 2011, now Pat. No. 8,314,699, which is a continuation of application No. 12/752,198, filed on Apr. 1, 2010, now Pat. No. 8,102,262, which is a continuation-in-part of application No. 11/693,352, filed on Mar. 29, 2007, now Pat. No. 7,701,339.

(60) Provisional application No. 60/787,864, filed on Mar. 31, 2006.

(51) Int. Cl.
| | |
|---|---|
| G08B 13/14 | (2006.01) |
| G08B 13/26 | (2006.01) |
| G06F 7/00 | (2006.01) |
| G06F 1/00 | (2006.01) |
| H03M 1/12 | (2006.01) |
| H04M 1/00 | (2006.01) |

(52) U.S. Cl.
USPC ............ 340/568.3; 340/568.1; 340/568.8; 340/562; 700/214; 713/300; 341/172; 455/572

(58) Field of Classification Search
None
See application file for complete search history.

(56) References Cited

U.S. PATENT DOCUMENTS

| | | | |
|---|---|---|---|
| 3,885,773 A | | 5/1975 | Dunkelberger |
| 3,932,857 A | * | 1/1976 | Way et al. ............... 340/568.2 |
| 4,849,682 A | * | 7/1989 | Bauer et al. ................ 320/106 |
| 5,223,815 A | * | 6/1993 | Rosenthal et al. ...... 340/539.21 |
| 5,377,737 A | | 1/1995 | Moriya et al. |
| 5,552,771 A | | 9/1996 | Leyden et al. |
| 5,884,403 A | | 3/1999 | Rogers |
| 6,039,496 A | | 3/2000 | Bishop |
| 6,310,550 B1 | | 10/2001 | Wagener |
| RE37,590 E | | 3/2002 | Leyden et al. |

(Continued)

FOREIGN PATENT DOCUMENTS

| | | |
|---|---|---|
| CA | 2096603 | 11/1994 |
| DE | 19528178 | 2/1997 |

(Continued)

*Primary Examiner* — Kerri McNally
*Assistant Examiner* — Emily C Terrell

(57) ABSTRACT

Methods, systems and other embodiments associated with charging merchandise items are presented. A method of charging merchandise items includes displaying merchandise items at a consumer display so that the merchandise items can be handled by a consumer. A first power supply charges a portion of the display that does not include the merchandise items and a second power supply charges the merchandise items. The merchandise items can be charged at the display on a multiplexed basis.

19 Claims, 7 Drawing Sheets

(56) References Cited

U.S. PATENT DOCUMENTS

| | | |
|---|---|---|
| 6,400,265 B1 | 6/2002 | Saylor et al. |
| 6,578,683 B1 | 6/2003 | Burke et al. |
| 6,659,382 B2 | 12/2003 | Ryczek |
| 6,690,277 B1 | 2/2004 | Hansen et al. |
| 6,700,488 B1 | 3/2004 | Leyden et al. |
| 6,799,994 B2 | 10/2004 | Burke |
| 6,828,909 B2 | 12/2004 | Script et al. |
| 6,879,961 B1 | 4/2005 | Pathirana |
| 6,896,543 B2 | 5/2005 | Fort et al. |
| 6,946,961 B2 | 9/2005 | Frederiksen et al. |
| 7,002,467 B2 | 2/2006 | Deconinck et al. |
| 7,015,596 B2 * | 3/2006 | Pail ................ 307/28 |
| 7,021,091 B2 | 4/2006 | Leyden et al. |
| 7,053,774 B2 | 5/2006 | Sedon et al. |
| 7,081,822 B2 | 7/2006 | Leyden et al. |
| 7,132,952 B2 | 11/2006 | Leyden et al. |
| 7,135,972 B2 | 11/2006 | Bonato |
| 7,154,039 B1 | 12/2006 | Marszalek et al. |
| 7,202,417 B2 | 4/2007 | Marszalek et al. |
| 7,202,786 B2 | 4/2007 | Marszalek et al. |
| 7,204,107 B2 | 4/2007 | Leyden et al. |
| 7,209,038 B1 | 4/2007 | Deconinck et al. |
| 7,327,276 B1 | 2/2008 | Deconinck et al. |
| 7,375,638 B2 | 5/2008 | Light et al. |
| 7,710,266 B2 * | 5/2010 | Belden et al. ............ 340/568.3 |
| 7,817,051 B2 | 10/2010 | Cheng et al. |
| 2001/0054952 A1 | 12/2001 | Desai et al. |
| 2003/0034890 A1 | 2/2003 | Baumeister et al. |
| 2003/0069964 A1 | 4/2003 | Shteyn et al. |
| 2003/0122671 A1 | 7/2003 | Jespersen |
| 2005/0134458 A1 | 6/2005 | Leyden et al. |
| 2005/0263315 A1 | 12/2005 | Marszalek et al. |
| 2006/0097875 A1 | 5/2006 | Ott |
| 2007/0152819 A1 | 7/2007 | Marszalek et al. |
| 2007/0194918 A1 | 8/2007 | Rabinowitz et al. |

FOREIGN PATENT DOCUMENTS

| | | |
|---|---|---|
| DE | 19726413 | 1/1999 |
| DE | 10250004 | 5/2004 |
| DE | 10250339 A1 | 5/2004 |
| DE | 202005015472 | 1/2006 |
| DE | 202005016181 | 2/2006 |
| DE | 102004053426 | 5/2006 |
| EP | 1030284 | 8/2000 |
| EP | 1417912 | 5/2004 |
| GB | 2440600 | 2/2008 |
| JP | 2001243564 | 9/2001 |
| JP | 2005309521 | 11/2005 |
| WO | 02/090693 | 11/2002 |
| WO | 03/032240 | 4/2003 |

* cited by examiner

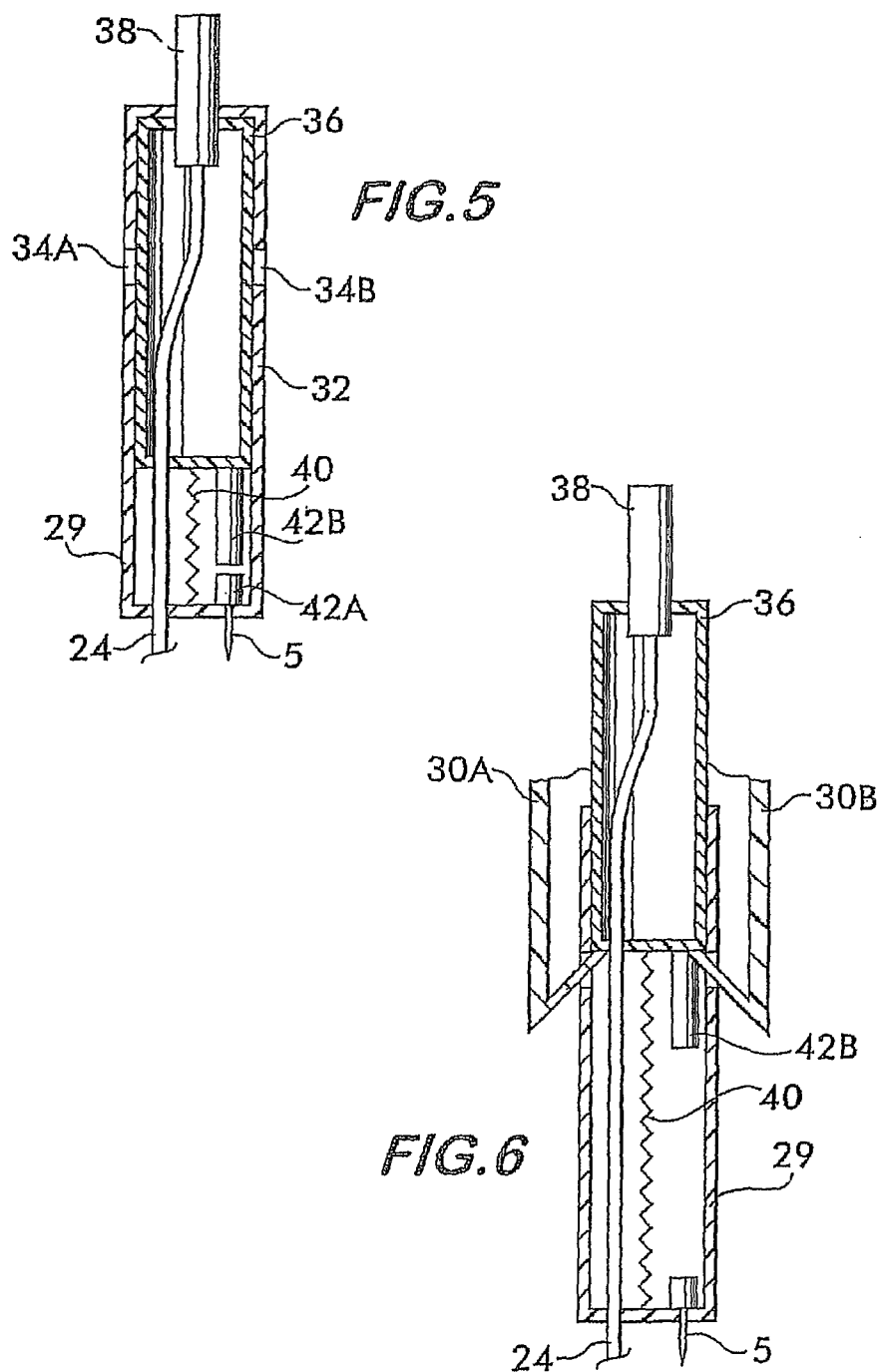

CHARGING MERCHANDISE ITEMS

CROSS REFERENCE TO RELATED APPLICATIONS

This application is a continuation of U.S. patent application Ser. No. 13/276,396, filed Oct. 19, 2011; which is a continuation of U.S. patent application Ser. No. 12/752,198, filed Apr. 1, 2010, now U.S. Pat. No. 8,102,262; which is a continuation-in-part of U.S. patent application Ser. No. 11/693,352, filed Mar. 29, 2007, now U.S. Pat. No. 7,701,339; which claims priority from U.S. Provisional Patent Application Ser. No. 60/787,864, filed Mar. 31, 2006; the disclosures of which are incorporated herein by reference.

BACKGROUND OF THE INVENTION

1. Field of Invention

The current invention relates generally to displaying items for merchandising purposes, and more specifically, to a system and method for displaying items on a counter or other structure in a commercial environment and providing a graphic display of information relating to the items at the counter or other structure so that persons approaching or touching such items can receive information relevant to the item while protecting the item from theft.

2. Description of Related Art

The surveillance of freely presented objects to protect them against theft by means of a sensor that is connected to a monitoring and alarm device via an electrical line is known in the art. Such items are commonly displayed on a counter or other structure for viewing by prospective buyers. When the line or the anti-theft installation is manipulated or the sensor is removed, the monitoring and alarm device sets off an audible and visual alarm. Moreover, sales-promoting systems are known using, for example, endless-loop audiovisual advertising. However, they suffer from the disadvantage of not allowing perfectly timed advertising geared to the specific information needs, accordingly resulting in high coverage losses. It has been proposed to provide a method and apparatus of the type initially referred to which enables specific product-related advertising while at the same time providing for reliable surveillance of the displayed object and requiring a comparatively small outlay, particularly in equipment and installation, by providing an audible alarm at the counter or a visual alarm at the display device when the item is attempted to be removed. The product information about the item on display is by means of audiovisual devices since this allows comprehensive information in a particularly intensive, fast and effective way. The audiovisual product information may be output preferably by means of a product information device including a video data base with a digital player and a connected visual display unit for visual display, and as the case may be, a loudspeaker and/or headset for listening.

Typically, a free presentation includes a plurality of objects. When, as a further action, events are counted and/or date and/or time of the day are saved, the detections may be stored with date and time of the day for later reference in statistical analyses in order to obtain information about the attractiveness of the object put on display. For this purpose, the monitoring and alarm device includes a storage memory for storing the event count and/or date and/or time of the event.

In the absence of a current event being detected, no product-related promotion will be shown. Instead, general advertising may be shown in the meantime which may include manufacturer advertising of the displayed object or market advertising. These advertising periods as well as the aforementioned statistical data obtained may be evaluated and/or sold to the manufacturers, for example.

More particularly, electronic products in the fields of information technology and audio/video equipment are, as a rule, freely presented in substantial quantities. When a theft alarm is set off, it is therefore difficult to locate the site of the theft promptly.

Therefore, it may be useful when, in the case of a theft, an audible alarm is set off and an at least visual alarm concerning the object to be secured is produced by the device provided for audiovisual product information.

In the case of a theft alarm, it is possible to output on the visual display unit associated with the stolen object a product-related alarm notification thereby enabling the site of the theft to be located promptly. Using the same infrastructure, it is also possible to place the freely presented items under surveillance allowing a fast, product-related visualization of the alarm on the one hand and promotion of the items on the other hand which results in significant cost reductions in investment and the obtainment/sale of statistical data. The logging sensor is also capable of tripping further promotional actions including, for example, actions that also address the remaining sense organs, such as scents, wind and the like. The sensor of the logging device may be a motion sensor. It operates to start the product information when a prospective buyer approaches or stands in front of the item on display. No additional action is required in this case. However, the possibility also exists for the sensor of the logging device to be a removal sensor. In this event, the product information is not started until the prospective buyer takes the item in his/her hand, showing an apparent interest in it. False activations that may be caused by a passing customer are thereby avoided. In either event, the product information is activated when the prospective buyer is within a predetermined range in the region of the displayed item.

The sensor of the logging device may be a switch, particularly a mechanical, capacitive, inductive, optoelectronic, or magnetic switch. Particularly advantageously, the sensor of the logging device is part of the anti-theft sensor arrangement, because this enables multiple use to be made of existing equipment. Moreover, the anti-theft sensor arrangement preferably includes a sensor affixed to the item to be secured, which sensor is connected to the monitoring and alarm device through a cable wound on a cable retractor, with the sensor of the logging device being configured to detect when the wound-up cable is being pulled off the cable retractor. The cable retractor provides for a "neat" presentation. The sensor may be configured as a magnetic switch comprising a reed contact mounted on the enclosure of the cable retractor and a magnet fitted to the pull-out type cable. In this arrangement, it is suitable for the magnet fitted to the cable to be constructed as a cable stop resting against an abutment with the cable in roughly wound-up condition. Such a sensor arrangement affords, among other things, the advantage of being able to be retrofitted with ease.

While the aforementioned apparatus and method are primarily concerned with the securing of items of merchandise, they may also find utility in exhibitions and galleries, for example, to provide the viewer with explanations/information, and on the other hand, in the securing of the exhibits, such as paintings, against theft. The theft detection sensor may be affixed preferably to the frame or the like while the logging sensor is preferably a motion sensor that, on recording a viewer's presence, starts the output of information.

It will be appreciated by those skilled in the art that while the foregoing proposed method and apparatus appears generally suitable for its purposes, it still leaves something to be desired from the standpoint of effective advertising and promotion of the items. In this regard, while the provision of an audible alarm at the counter (or even a visual alarm on the display device on or adjacent the counter) may have the effect of deterring or preventing theft, it creates a negative atmosphere (e.g., other potential customers in the vicinity of the display may be frightened or otherwise put off by a sounding alarm indicating a theft has occurred). Thus, there is a need in the art for a system and method which provides the advantages of enabling persons to readily examine an item and receive information relevant to that item when they pick up or touch the item, while protecting the item against theft by producing a wireless signal to authorized personnel located remotely from the display.

All references cited herein are incorporated herein by reference in their entireties.

BRIEF SUMMARY OF THE INVENTION

In accordance with one aspect of the invention, there is provided a system for displaying an item and providing promotional material about the item on a graphic display in a commercial environment. The item is located on a counter or other structure in the commercial environment to enable persons to approach and examine the item at that counter or other structure.

The system comprises an event sensor associated with the item, a monitoring and alarm apparatus and a product information device (e.g., a graphic display). The event sensor (e.g., a retractable tether or cable with cooperating sensors, or non-contact sensors such as proximity sensors, motion detection sensors, etc.) detects the manipulation of, or approach of a user to, the item, and wherein the event sensor is coupled to the monitoring and alarm apparatus. The event sensor emits a sensor signal to the monitoring and alarm apparatus corresponding to the manipulation of, or approach of a user to, the item. The product information device (e.g., a graphic display) is arranged to receive an activation signal from the monitoring and alarm apparatus when a user approaches or touches the item at the counter or other structure, whereupon the product information device provides visual information (and also may include audible information) relating to the item. The monitoring and alarm apparatus includes a transmitter which is arranged to automatically provide a wireless signal in the event that a person removes the item from the vicinity of the counter or other structure. The system also includes a receiver (e.g., a cellular telephones, etc.) located remotely of the counter or other structure. The receiver is arranged to receive the wireless signal to alert an authorized person of the removal of the item from the vicinity of the counter or other structure.

In accordance with a further aspect of this invention, the system also includes the added feature that if the item is an electronic item (e.g., cellular telephones, cameras, portable DVD/CD players, memory sticks, camcorders, etc.), the system also provides power to the electronic item while detecting the manipulation or removal of the electronic item.

In accordance with another aspect of this invention, it also provides a method for displaying an item and providing promotional material about the item on a graphic display in a commercial environment while deterring theft. The method includes displaying the item on a counter or other structure in the commercial environment to enable persons to approach and examine the item thereat; detecting the manipulation of, or the approach of a user to, the item and generating a graphic display including visual or audible information relating to the item in automatic response to a user approaching or touching the item at the counter or other structure. This method includes automatically transmitting a wireless signal to a remote receiver (e.g., cellular telephones, etc.) in the event that a person removes the item from the vicinity of the counter or other structure, the receiver being arranged when it receives the wireless signal to alert an authorized person of the removal of the item from the vicinity of the counter or other structure.

In accordance with further aspects of this invention where the item is an electronic item (e.g., cellular telephones, cameras, portable DVD/CD players, memory sticks, camcorders, etc.), the method also includes providing power to the electronic item while detecting the manipulation or removal of the electronic item.

In accordance with a further aspect of this invention, there is provided a system for displaying an item and providing promotional material about the item on a graphic display in a commercial environment, the item being located on a counter or other structure in the commercial environment to enable persons to approach and examine the item thereat. The system comprises: an event sensor coupled to an electronic item (e.g., cellular telephones, cameras, portable DVD/CD players, memory sticks, camcorders, etc.) via a tether for physically securing an electronic item to the counter or other structure in the commercial environment to deter unauthorized removal of the item from the counter or other structure. The event sensor detects the manipulation of, or approach of a user to, the electronic item, whereby the event sensor is also coupled to a monitoring and alarm apparatus and wherein the event sensor emits a sensor signal to the monitoring and alarm corresponding to the manipulation of, or approach of a user to, the electronic item. The system also includes a product information device arranged to receive an activation signal from the monitoring and alarm apparatus when a user approaches or touches the item at the counter or other structure, whereupon the product information device provides visual information relating to the item; and wherein the tether comprises a power conductor and a sensor signal conductor, whereby the power conductor and sensor signal conductors have ends that are contained within a power jack that couples to the electronic item for powering or charging the electronic item at the counter or other structure.

In accordance with another aspect of this invention, there is provided a method for displaying an electronic item (e.g., cellular telephones, cameras, portable DVD/CD players, memory sticks, camcorders, etc.) and providing promotional material about the electronic item on a graphic display in a commercial environment. The method comprises: displaying the electronic item on a counter or other structure in the commercial environment to enable persons to approach and examine the electronic item thereat; powering or charging the electronic item at the counter or other structure; detecting the manipulation of, or the approach of a user to, the item; and generating a graphic display including visual or audible information relating to the item in automatic response to a user approaching or touching the electronic item at the counter or other structure.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5 is a cross-sectional view of an exemplary power jack for use in the embodiment of FIG. 4 and shown in the unconnected condition; and FIG. 6 is a cross-sectional view of the power jack of FIG. 5 shown in the extended condition when connected to the electronic device.

Similar numbers refer to similar parts throughout the drawings.

DETAILED DESCRIPTION

Figure 1:
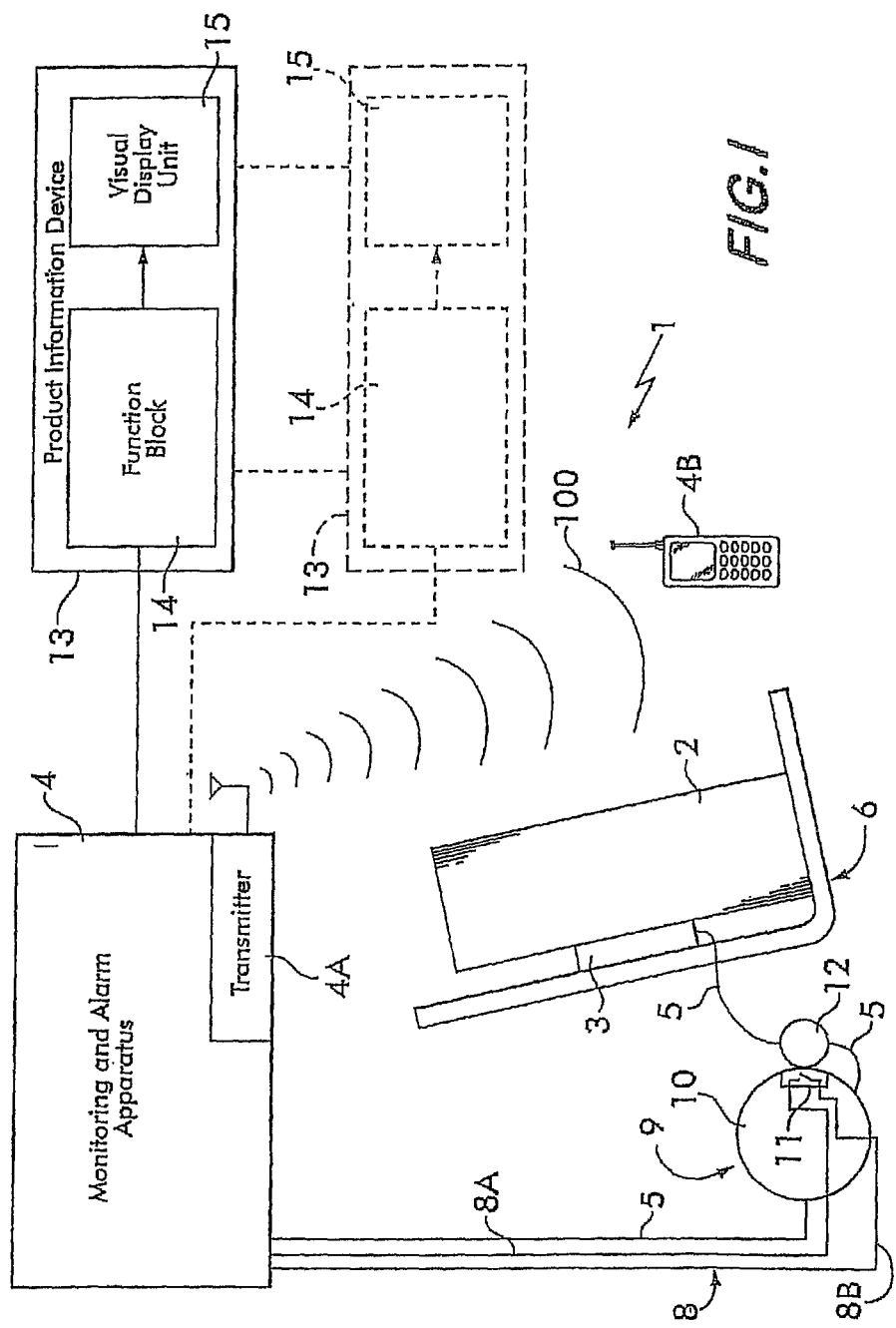
FIG. 1 is a functional diagram of one exemplary system for protection against theft as well as for the automatic output of product information constructed in accordance with this invention and which carries out the method of this invention.
Figure 1A:
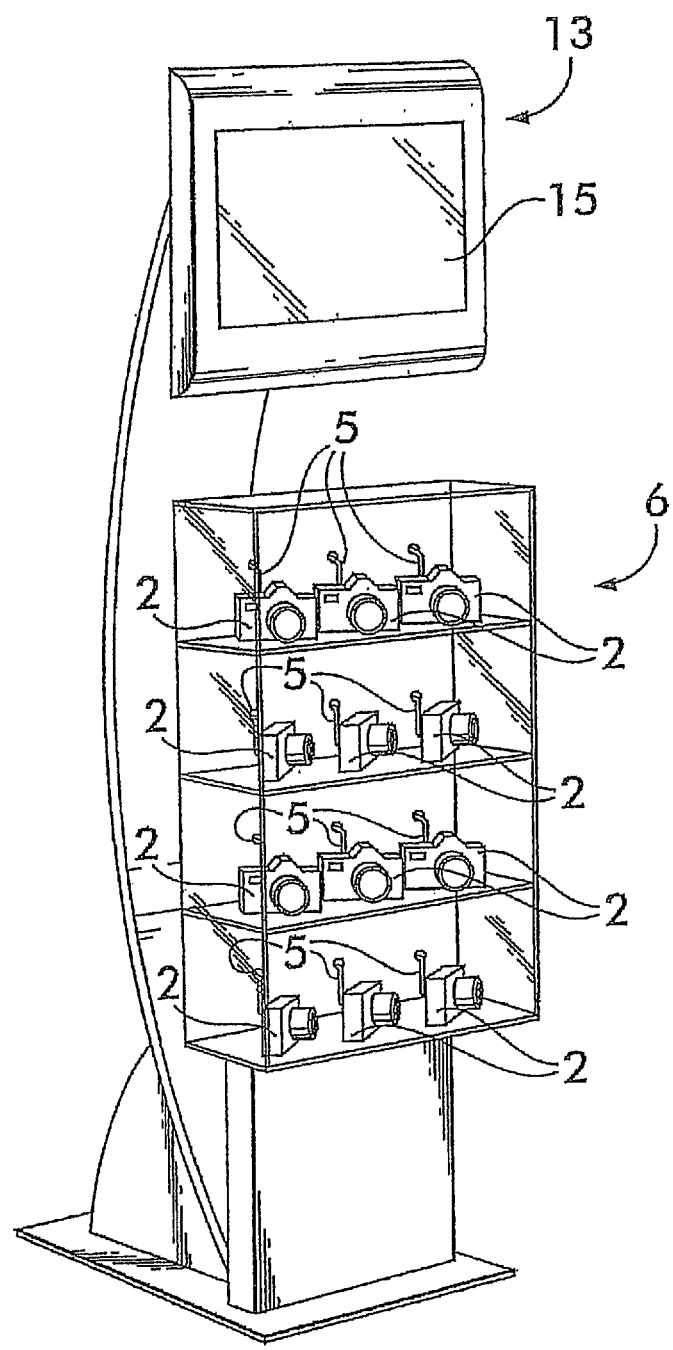
FIG. 1A provides an exemplary product display (e.g., a camera display) using the system and method of the present invention.

Referring now to the various figures of the drawing wherein like reference characters refer to like parts, there is shown in FIG. 1 a system and method for displaying one or several items, or mobile electronic devices (e.g., products such as cellular telephones, cameras, portable DVD/CD players, memory sticks, camcorders, etc.) so that people can approach the counter or other structure where such items are being displayed to examine them and to receive information about the item or having some relevance to the item via an associated graphics display located at or adjacent the counter or other structure at which the item(s) is(are) located. The display may include audible transducers for providing sound with the visual display. FIG. 1A provides an exemplary product display, counter or other display (e.g., a camera display) using the system and method of the present embodiment. In any case, the system and method is arranged so that an alarm will be set off if the item(s) is attempted to be stolen. The system 1 shown in FIG. 1 thus serves the dual purpose of protecting items of merchandise put on display or objects 2 against theft and performing a logging function when a person approaches the object 2 or removes the object without taking it away. The portion of the system 1 that provides this dual function is known as a "contents management system" (CMS) that combines loss prevention features with advertising. Alternatively, the CMS could be configured to just provide advertising.

Figure 2:
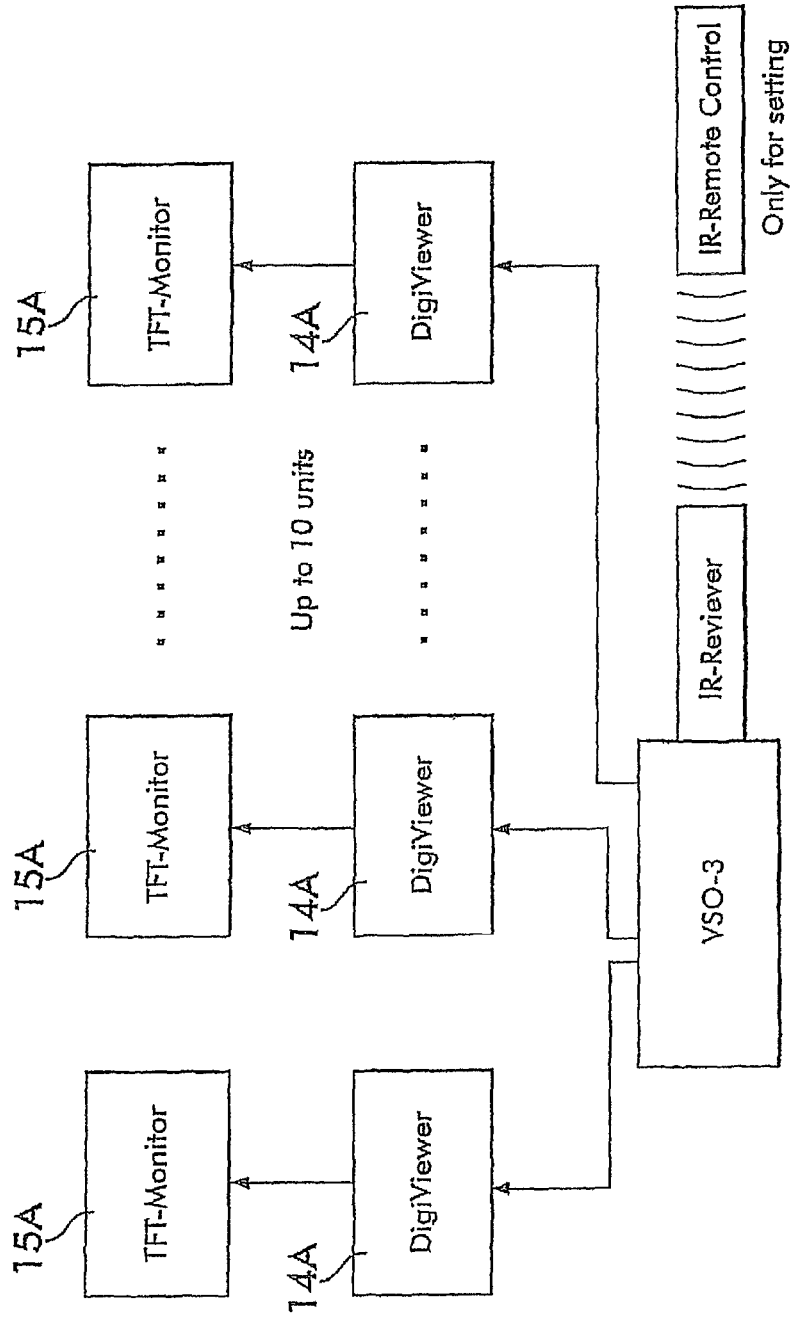
FIG. 2 is a functional diagram of an exemplary content management structure (CMS) for providing advertisement with the displayed product.
Figure 3:
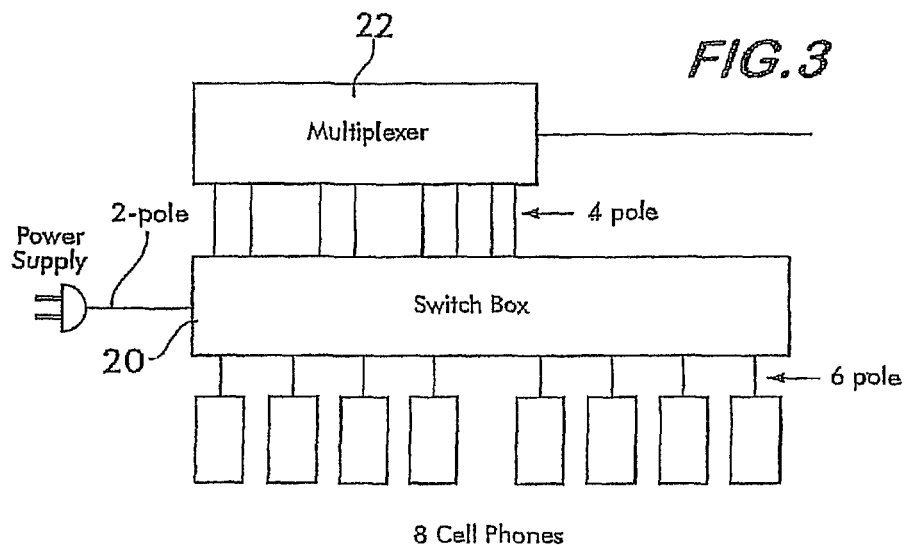
FIG. 3 depicts a powering feature of the system and method of the present invention for powering/charging electronic devices on display while providing theft detection and product advertisement initiation.

When a logging function is performed, at least one action, namely a product information about the object on display, is started. The objects 2 (e.g. cell phones, cameras, etc.) are freely accessible to the prospective buyer in one or several display shelves 6. Depending on the configuration of the apparatus 1, up to 250 items may be subjected to surveillance and presented by audiovisual devices. When a customer picks up a displayed product, an "event" gets triggered and a short advertisement is played out on monitor 15 (e.g., a TFT-monitor). By way of example only, FIG. 2 depicts a functional diagram of a CMS advertisement embodiment that uses a plurality of monitors 15A (e.g., a TFT-monitor) and video database and digital player 14A (e.g., DiGiViewer DV-325). Whenever a customer picks up a displayed product, an "event" is triggered and a short advertisement is played out at the TFT monitor 15A via the VSO3 (e.g., a hardware controller) and a DiGiViewer (e.g., a hardware controller). The DiGiViewer stores the advertisements and the VSO3 provides the interface.

The apparatus 1 includes a theft detection sensor 3 that is affixed to the object 2 to be secured and is connected to a monitoring and alarm device 4 by means of a cable 5. When the sensor 3 responds when removed from the object 2 or when the cable 5 is severed or manipulated, a theft alarm is produced. The monitoring and alarm device 4 comprises, among other things, memory for event or occurrence counts (e.g., object manipulation), date and time of occurrence. A further improvement of the alarm device 4 is the provision of a transmitter 4A that provides a wireless signal 100 to a store manager, a store employee's PDA (personal digital assistant), cell phone 4B, other wireless receiver, or to a secure monitor that alerts the individual that a theft is in progress. The signal also provides identification of the item being stolen and its location in the retail establishment. Thus, instead of setting off a general alarm, a "silent alarm" or "specified alarm" is provided to the proper personnel who can take swift and appropriate action without alarming the other customers in the vicinity.

When a person approaches or removes the object 2 on display, this will be recorded by a logging device, the ensuing action then being an audiovisual product information. In the embodiment shown, the logging device includes an "event" or "removal" sensor 7 which is in controlling communication with the monitoring and alarm device 4 provided as anti-theft device via a cable 8, so that both functions require only one shared monitoring and alarm device. Although not shown, the monitors 15 (or 15A) may be associated with I/O devices that the customer can interact with and input particular information that can modify the advertising experience for that customer. By way of example, the I/O device may include a card reader, (e.g., a membership card) that allows the CMS to customize the advertisement being played out to the customer.

The cable 5 connected to the theft detection sensor 3 is wound on a cable retractor 9. The removal sensor 7 is configured to detect when the wound up cable 5 is being unwound from the cable retractor 9. In the embodiment shown, the sensor 7 is constructed as a magnetic switch having a reed contact 11 fitted to the cable retractor enclosure 10 as well as a magnet 12 fitted to the pull-out type cable 5. The reed contact is preferably embedded in plastic and may be mounted on or in the cable retractor enclosure 10. A cable 8, formed by reed contact conductors 8A/8B, provide the monitoring and alarm device 4 with the reed contact 11 state. Aside from its function as a permanent magnet 12 for switching the reed contact 11 as soon as the magnet 12 leaves its position of rest when the cable 5 is pulled out, causing the magnetic field at the reed contact 11 to be interrupted, the magnet 12 has the added function of a cable stop for pull-relief of the cable 5 and the connected sensor 3 in the rest position. In this arrangement, the magnet 12 affixed to the cable 5 functions as a cable stop (or cable-restraining detent, whereby if the cable 5 is rolled completely out, the magnet acts as a counter detent), resting in roughly wound-up condition of the cable 5 against an abutment defined by the enclosure 10 in this embodiment. It is particularly advantageous in this arrangement for the sensor 7 (event sensor) to be retrofittable easily, to be a low-cost and sturdy item and to require little space.

Other possible "event" sensors may include optical or photosensors, motion sensors, inductive sensors, or even push button sensors (e.g., for use on large electronic products such as washing machines, etc.; by way of example only, a customer may depress a button on the machine to initiate product information). Furthermore, by way of example only, approximately 256 sensors can be used in one CMS network. To obtain the dual function of the CMS (e.g., loss prevention and advertisement), approximately 128 products can be secured and promoted at once. Sixteen VSL units and 128 sensors are directed to the advertisement function while 16 VSLs and 128 sensors are directed to loss prevention.

For presenting the objects 2 on display, product information devices 13 are in controlling communication with the monitoring and alarm device 4. The product information device 13 contains a function block 14 with a video data base and a digital player as well as a visual display unit 15. The dashed lines indicates that plural, for example, ten, product information devices 13 may be connected to the monitoring and alarm device 4.

Depending on which removal sensor 7 was activated, the associated product information is retrieved from the video data base and shown on the visual display unit 15. A product information device 13 may be assigned to single objects 2 or a plurality, particularly a group, of similar objects on display. How many objects 2 are allocated to a product information device 13 depends, inter alia, on the object size. For example, twenty five exhibits 2 may share one product information device 13 with a video data base and a digital player as well as a visual display unit 15.

The modular design enables the apparatus 1 to be configured individually in conformity with the given conditions. Thus, an existing apparatus for theft detection is readily extendable and with relatively little effort to include one or plural product information devices 13 and one or plural removal sensors 7, providing a system enabling the output of specific product information. On the other hand, the product information device 13 or several such devices may also be used as standalone with one or several removal sensors 7.

Figure 1B:
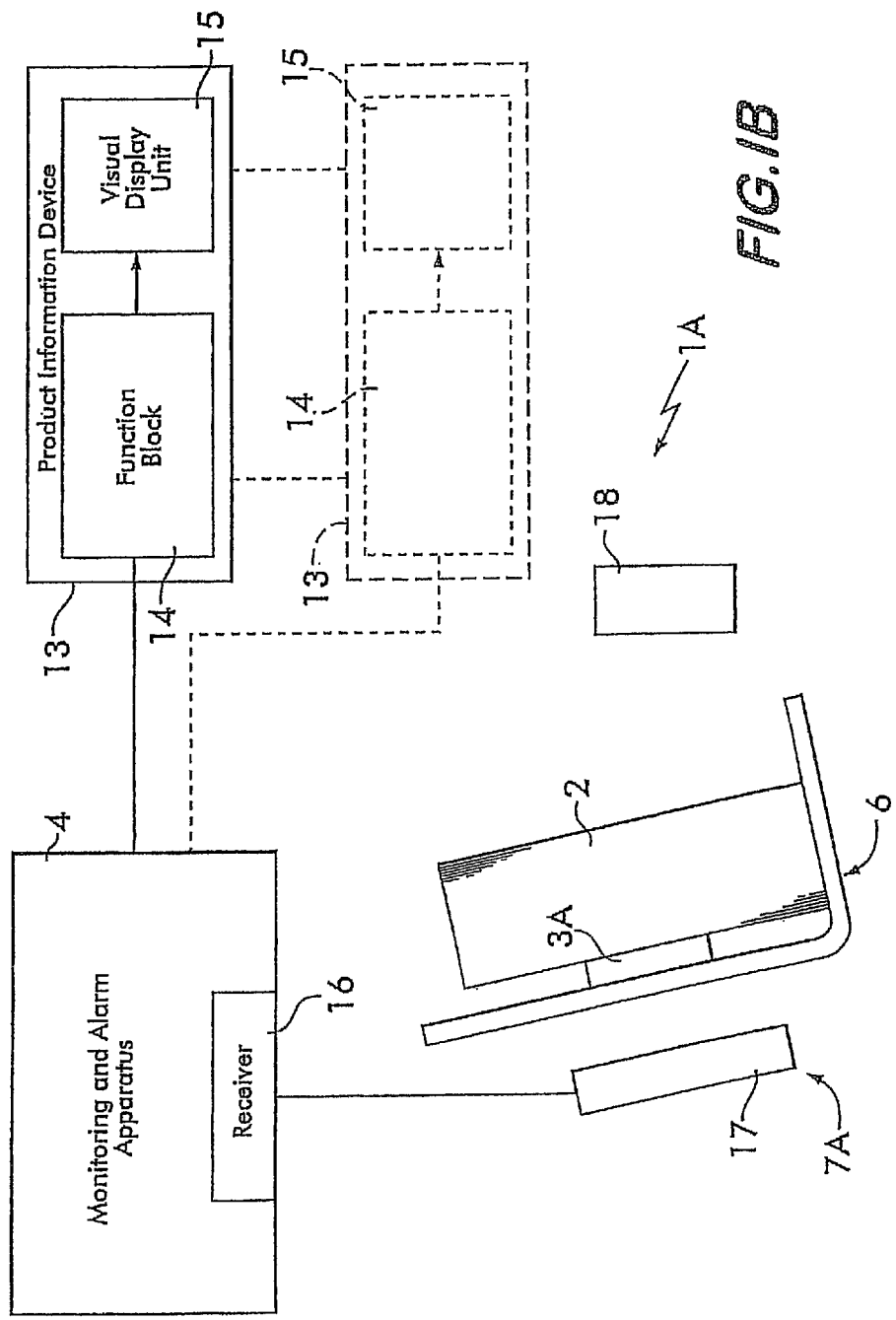
FIG. 1B is an alternative exemplary system for protection against theft whereby a non-contact sensor is used for detecting the manipulation and movement of a product being protected using the present invention.

FIG. 1B shows, in an alternative apparatus, an apparatus 1A, wherein a non-contact sensor, e.g., a proximity sensor 7A, is used rather than the tether or cable 5. Such a proximity sensor is placed in the neighborhood of an object 2 to be protected and the separating distance between this proximity sensor 7A and the object 2, or between the proximity sensor 7A and an approaching person (not shown) is determined and stored. The measurement of the separating distance can be utilized for, among other things, the emission of a signal. This signal may activate an advertising experience (visual and/or audible and/or tactile) regarding information corresponding to the object 2 being approached and/or manipulated and/or a forewarning of a theft of the object 2. If the object 2 is removed, and is positioned, for example, within a removal distance of two meters, it is possible that a registration of the displacement can be given. Such a registration can be, for example, the activation of an LED lamp (not shown, but in the vicinity of the display shelf where the object 2 was originally placed), which informs the person making the removal that his/her actions have been detected. If, for example, he/she removes the object 2 to a distance exceeding two meters, i.e., from the proximity sensor 7A, then this would be evaluated as a theft and an alarm would be emitted to the business personnel. Upon the approach of a person to the object 2, the possibility exists that simultaneously with the forewarning of a possible theft, the information pertaining to the state of the object 2 could be emitted. The proximity sensor 7A can also be so designed, so that it would react to any touching or disturbance of the protected object 2. The emission of a signal can, in this way, be released by an approach to, removal of, or disturbance of the protected object 2.

In particular, the proximity sensor 7A comprises an antenna 17 or the like, which serves as a detection element. The antenna 17 can be integrated with a monitoring and alarm apparatus 4 via a receiver 16. The antenna 17 is placed behind the object 2 to be protected and/or even behind the presentation display shelve 6.

The proximity sensor 7A serves for the capture of the separating distance from the antenna 17 of the proximity sensor 7A between a person (not shown) and/or the object 2 to be protected itself and/or another sensor 3A placed on the object 2. In this way, it is possible that in connection with the proximity sensor 7A the monitoring and the alarm apparatus 4 can be adjusted for signaling upon an approach, for disturbance of the object, or for the removal of the object 2 within a predetermined distance of removal. The adjustment can also include arrangements for theft, designated by the removal of the object 2 by exceeding the predetermined removal distance.

In an exemplary embodiment, a sensor 3A is attached to the object 2 to be protected. The sensor 3A comprises at least a digital/analog input, e.g., a microswitch or a security film for theft prevention as well as for surveillance of batteries in a supply battery assembly.

The proximity sensor 7A reacts also to the approach of a person to the antenna 17, wherein the active distance, for example, can be two meters. Thus, registration can be made which indicates whether the person approaching the antenna 17, the antenna 17 being located near the protected object 2, is nearing the object 2 and also detects from what direction the approach is being made.

Further, this proximity sensor 7A registers by means of the antenna 17, the existing separating distance between the object 2, which has its own sensor 3A, and the antenna 17. Thereby, it is possible to detect whether or not the protected object 2 has been removed from the display case 6 and to what distance it has been displaced from its original displayed position. As mentioned previously, for example, a registration signal can be emitted, in order to inform the user that the action, possibly his own, has been detected and registered.

Especially, by the responsive action of the proximity sensor (i.e. the separating-distance sensor 7A), it is possible that an object-specific advertisement and information for a viewer can be initiated. In a case of a more remote distancing of the protected object 2 from the object storage position (this being on the display case or shelf 6) a theft alarm can be sounded or displayed to the appropriate business personnel.

Under certain circumstances, it is possible that additional tracking measures could be undertaken (e.g., a pursuit of the removed object 2 could be carried out within the confines of the business with corresponding signaling). In such tracking actions, the sensor 3A has a function which may be compared to that of an integrated circuit which is implanted on such an object 2, e.g., a transponder chip (RFID, Radio Frequency Identification).

In addition, the distance sensor 7A can register, by the use of the antenna 17, whether an approaching person is permitted or not, to be present in certain places or on certain equipment. Permitted persons carry an electronic key 18 with them, which sends corresponding characteristic data to the antenna 17 and therewith to the receiver 16. The receiver 16 can transmit this data to a supervisory database or to business personnel via the monitoring and alarm apparatus 4. Thus, there is provided a wireless testing of legitimacy with specially effective capacity for transmission.

The possibility also exists that the distance sensor 7A possesses a plurality of antennae 17 at one station of supervision. These antennae would be so ordered that, in at least one instance, even the removal apparatus for the taking of the protected object 2 could be detected. It is also possible that several antennae could be placed in apportioned distances apart, for example, at intervals of five meters within either a market or within such a spatial enclosure in order that a spatial pursuit of the protected object, especially for tracking purposes, could be carried out.

To the monitoring and alarm apparatus 4, a plurality of distance sensors 7A can be associated whereby an antenna for each monitoring station can be sent to one receiver 16.

It should also be mentioned that for the approach/disturbance sensor, even the conductivity of the skin and an electrostatic field can be made use of. In this operation, a transmission of data by means of the skin and otherwise a recognition of the change of an electrical field by a person is possible. To implement such an arrangement, for example, a transmitter integrated into an electronic key 18 (FIG. 1B) can produce an electrostatic field and radiate its signal onto the skin of a person, whereby this can even function without direct skin contact. By means of modulation of data on the signal voltage, which spreads itself over the entire skin surface, information or data can be transmitted, for instance, which provides identification. From a practical standpoint, this can be constructed with the following background:

In the case of an active data transmission by means of the skin, small, bodily-carried transmitters produce an electrical field by means of which, the coded data can be sent directly or capacity-wise to one or more receivers. The transmitted information can in this way identify an object or a person.

The reception of such signals is, however, only possible if the sender is equipped with apparatuses which are close to the body. As a result, it is possible that immediately circuitry processes are released. This process, or processes, can however be reversed. If these apparatuses are removed and thereby the transmission is broken off, then appropriately, an immediate switch action occurs. Even the alteration of an electrical field by means of an approaching person or the entry of a person into an electrostatic field can be detected in this manner. In this way, the approach of a person can be passively recognized, which can give rise to appropriate action. For instance, this can be used for the transmission of the object information.

Excluding the active transmission of object information (advertising), passive detection of the approach of a person can be done without identification of the receiver.

If on the object 2, which is to be protected, for instance, a sensor 3A is installed with a transmitter, then upon theft of the object 2, the location of the stolen object 2 can be detected. This is possible because the transmitter is installed on the (now stolen) object 2 and communicates to the skin surface of the person and thereby builds an electrostatic field. This field, by means of a receiver, which may be one of many distributed in different locations in the, for instance, business can be received, so that a search of the stolen object 2 is possible. In this way, by means of equipping the proximity sensor 7A and/or the sensor 3, which latter is installed on the object 2 to be protected with a transmitter, an electrostatic field can be produced, which field can be employed in various manners. The electrostatic field can, as previously stated, be communicated to the skin of a person and used, for example, for the transmission of data. Otherwise, it is also possible that an evaluation of the change of an electrostatic field, which change has been instigated by a person, can be used for the release of an appropriate action.

The sensor 7A can serve as a special proximity sensor wherein it will be installed as an instrument sensitive to a separating distance. Such a proximity sensor would be placed in the neighborhood of an object to be protected and the separating distance between the proximity sensor and the object, or between the sensor and an approaching person is determined and registered.

The measurement of separating distance can be utilized for, among other things, the emission of a signal. The eventual use could include the activation of reporting a product specific item of information and/or a forewarning of a theft. If the product is removed and lies, for instance, within a removal distance of two meters, it is possible that a registration of the displacement can be given. Such a registration could be, for example, the activation of an orange LED lamp which would inform the person making the said removal that his action has been registered. If, for example, he removes the object to a distance exceeding two meters, i.e. from the proximity sensor, then this would be evaluated as theft and an alarm released.

Upon the approach of a person to the said object, the possibility exists that simultaneously with forewarning, the said information regarding the state of the product could be emitted. The proximity sensor can also be designed so that it would react to any touching or disturbance of the said protected object. The emission of an action can, in this way, be released by an approach to, removal of, or disturbance of the protected object.

It should be understood that it is within the broadest scope of the preferred embodiment to include the use of the non-contact sensor 7A of FIG. 1B into the system depicted in FIG. 1. Thus, the non-contact sensor 7A (FIG. 1B) can be substituted for the tethered configuration of FIG. 1.

FIGS. 3-6 depict another feature of the system and method of the preferred embodiment: charging or powering the electronic devices on display. Thus, not only is theft protection and advertisement provided by the system and method of the preferred embodiment but so is the powering of these devices. By way of example only, eight cellular phones that are displayed can be powered through a switch box 20 which is connected to a single power supply. Under the control of a multiplexer 22 connected to the CMS, the switch box 20 alternates the charging of the 8 phones every predetermined number of minutes (this time interval can be modified as desired) so that a smaller power supply can be used (2 pole). The eight cell phones may be connected to the switch box 20 via eight, 6-pole conductors wherein the switch box 20 is controlled via eight, 4-pole conductors. Alternatively, constant charging of all products could be possible as well with a stronger power supply. Each displayed cell phone is connected to one sensor (e.g., via adhesive pad) which secures and charges the product.

The preferred embodiment may be configured as a display system for displaying several merchandise items. The display system includes a display area to display the merchandise items to allow a customer to handle the merchandise items. The display system includes a merchandise item charger and a multiplexer. The merchandise item charger provides a charging signal while the multiplexer is configured to provide the charging signal to one or more of the merchandise items on a multiplexed basis. The multiplexer can be configured to provide the charging signal to the plurality of merchandise items on a round-robin time multiplexed basis with a time period. In one configuration, each merchandise item is charged for the time period in a sequential order.

Additionally, the merchandise item charger can be configured to provide a fixed charging signal. When the charger provides a fixed charging signal, the multiplexer is configured to provide the fixed charging signal to one or more merchandise items in a time period. For example, if the charger provides a fixed charging signal of 1 ampere (A), then the charger could provide the charging signal to two merchandise times that each take one half ampere (½ A) of charging current. During the next time period, the charger could provide the charging signal to three merchandise times that each take one third ampere (⅓ A) of charging current.

The display system can also be implemented with a switch box that has a plurality of ports. Tethers similar to those discussed earlier can be connected between at least some of the ports and the merchandise items. When the system includes tethers, the multiplexer is configured to provide the charging signal to the merchandise items through the plurality of tethers.

The multiplexer of the display system can include detection logic. The detection logic is configured to determine when a merchandise item is connected to one of the ports through a tether. The multiplexer will not provide the charging signal to a port when a merchandise item is not connected to one of the ports through a tether. This saves energy by not providing the charging current to a port that is not connected to a merchandise item.

The display system may further include handling detection logic and a display. Similar to detecting handling as discussed earlier, the handling detection logic is configured to detect a selected merchandise item being handled by the customer. The display is configured to display audio information and video information about the selected merchandise item when the selected merchandise item is detected as being handled by the customer. This allows the display to provide information tailored to the merchandise item that a customer is handling which may in turn prompt the customer to purchase the selected merchandise item.

The display system may include a system charger and alarm logic. The system charger is configured to provide power to the display and the detection logic. The system charger will in general power the display system but will not provide power to the merchandise items on display. The alarm logic is configured to generate an alarm when one of: the system charger and the merchandise item charger loses power. The alarm logic is configured to not generate the alarm when both the system charger and the merchandise item charger lose power. By generating an alarm when only one of these conditions exist, an alarm is not generated when everything loses power such as during a store-wide power outage. A thief of the merchandise items is more likely to disable one of the two power supplies rather than both power supplies at the same time. The system can also be configured to generate an alarm when one or more of the merchandise items are removed from a corresponding tether.

Figure 4:
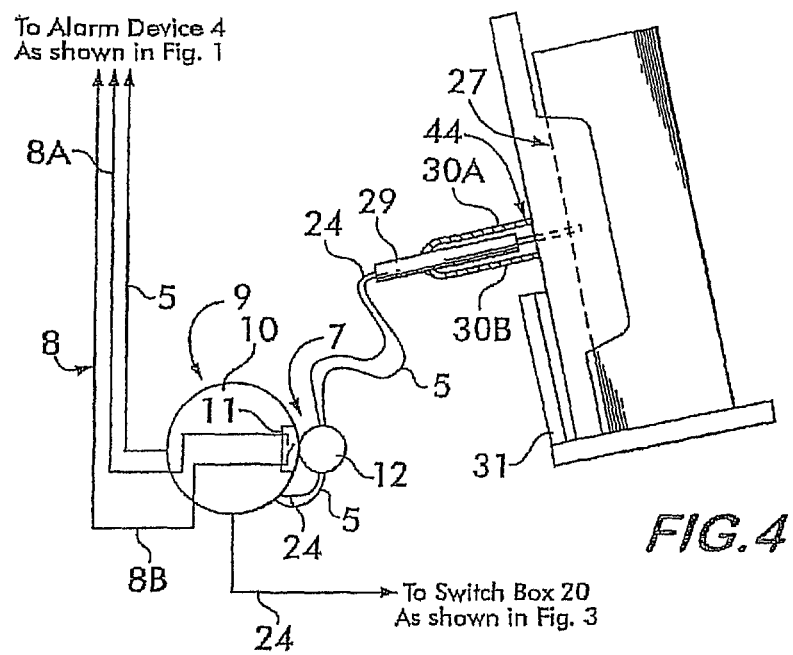
FIG. 4 is a functional view of the powering/charging feature of the present invention whereby power/charge is provided to an electronic item along with theft detection and product advertisement.

The preferred embodiment is shown in a configuration in FIGS. 3-6 using the CMS (including product information devices 13), transmitter 4A and other wireless receivers 4B, as shown in FIG. 1. However, in this configuration, the ability to power the electronic device on display, as well as the theft alert detection, are provided via the tether. In particular, as shown in FIG. 4, the theft detection sensor comprises proximity sensor or reed switch 42A (as will be discussed in detail later) with cable 5 providing the sensor signal path. An electronic device cradle 27 holds the electronic device 2. An aperture (not shown) in the cradle 27 permits the insertion of a power jack 29 into the electronic device 2 to keep it powered. A pair of fingers or coupling members 30A and 30B (e.g., molded to the back of the cradle 27) secure the power jack 29 as will be discussed in detail later. It should be noted that the back surface 31 of the shelf display 6 is shortened to permit the use of the cradle 27.

FIG. 5 is a cross-sectional view of the power jack 29 in the unconnected state. The jack 29 comprises an outer housing 32 having a pair of apertures 34A and 34B on opposing sides of the housing 32. Concentrically and slidably mobile within the housing 32 is an electrode element 36 for supporting power electrode 38 which receives power through power conductor 24. The base of the electrode element 36 is coupled to the base of the housing 32 using a spring 40. A proximity sensor, or reed switch 42A (attached to the inside base surface of the housing 32) having an associated sensor conductor 5 includes a corresponding element 42B (e.g., magnet) attached to the base surface of the electrode element 36. In order to connect the power jack 29 to the electronic device 2, store personnel need to pull the electrode element 36 out of the housing 32 and to allow the fingers 30A and 30B to pass through the respective apertures 34A/34B as shown in FIG. 6. This can be accomplished by the person pressing the fingers 30A/30B at the neck 44 (see FIG. 4) to spread the ends of the fingers 30A/30B and to allow the fingers 30A/30B to pass through the apertures 34A/34B and to capture the bottom surface of the electrode element 36 against the bias of the stretched spring 40. The electrode 38 can be inserted through the aperture (not shown) in the cradle 27 and into the power receptacle (not shown) of the electronic device 2. In this position, the proximity sensor or reed switch 42A is displaced away from the corresponding element 42B. In this position, the signal conductor 5 conveys a "non-theft" condition to the alarm device 4. As a result, the electronic device 2 is being powered while an "non-theft" condition signal is provided to the alarm device 4 and if a customer grasps the electronic device 2 and manipulates it, the removal sensor 7 is activated to initiate the product advertisement. Should a thief attempt to disconnect the electronic device 2 by jerking the device 2 away from the power jack 29, or being savvy enough to squeeze the fingers 30A/30B together to release the power jack 29, the electrode element 36 snaps towards the base surface of the housing 32 due to the spring 40 bias, and the proximity sensor 42A detects the corresponding element 42B and reports the theft condition. Thus, by use of the configuration shown in FIGS. 3-6, powering/charging, anti-theft and product advertisement initiation are accomplished.

It should be understood that it is within the broadest scope of the preferred embodiment to include the powering or charging feature of an electronic item along with the automated product advertisement-initiated-upon-manipulation of/approach to the electronic item, independent of the automatic transmission of the wireless signal 100 from the transmitter 4A to the remote receiver 4B (FIG. 1).

Thus, some of the advantages of the system and method of the present invention are:

- Reduces staff's work load (explaining products), helps them focus on real service.
- End customers do not have to wait to get product information in case staff is busy.
- Quick and detailed product information at a glance.
- Helps customer make a qualified decision about which product suits his/her needs best.
- Extended offers (accessories) for individual products.
- Retailer can rent out advertisement space to manufacturer (during special promotions or "stand-by mode").
- No need anymore for "hard-copy" price labeling, product information display; therefore more products can be displayed (unless hard-copy labeling is required by law).
- Possibility of customer-oriented display of secured products together with product promotion.

Furthermore, it is within the broadest scope of the preferred embodiment to include the creation of statistics (e.g., via CheckPro Manage®) using the CMS as to which product was picked up the most, hit list, etc). This also includes the creation of hit lists regarding product interest of customers/sales data/etc. in connection with merchandise planning and control systems and CheckPro Manager.®. data. The statistics ad hit lists can be provided via Ethernet.

Because the electronics industry is constantly developing new high technology products and due to the complexity of the offered products, it is becoming more and more difficult for an end customer to distinguish between displayed items and decide which one would serve his/her needs best. However, by playing customized advertisements as soon as the product gets picked up by the customer this distinction becomes much easier.

It is within the broadest scope of the preferred embodiment to secure of electronic as well as non-electronic devices (e.g., bottles, razors, etc.) while still promoting the sale of these items.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
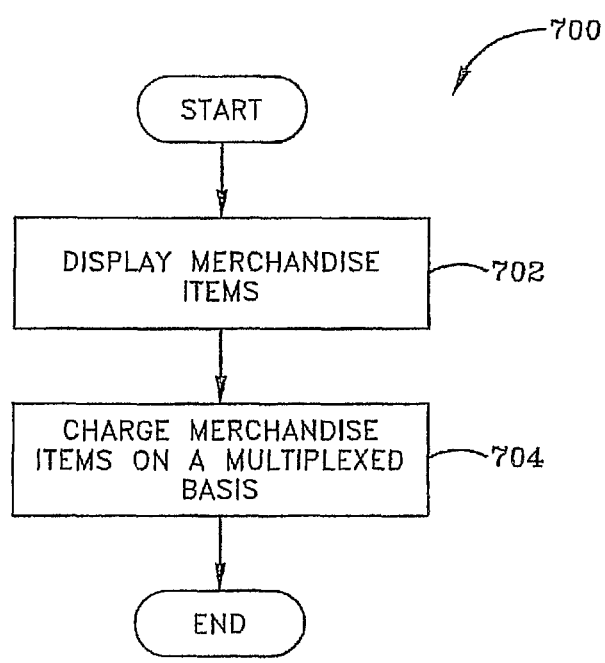
FIG. 7 is illustrates an example method associated with charging merchandise Items.

FIG. 7 illustrates a method 700 of charging merchandise items. As previously mentioned, the merchandise items may be electronic devices such as cellular telephones, cameras or other electronic devices. The method 700 begins by displaying merchandise items at a consumer display, at 702, so that the merchandise items can be handled by a consumer.

The merchandise items are charged at the display on a multiplexed basis, at 704. For example, the merchandise items may be charged on a round robin basis. The charging can take place for fixed time periods that may be equal time periods.

The merchandise items may be charged with an amperage value and the charging can include charging corresponding numbers of the merchandise items requiring the amperage value of current during each of the time periods. As previously discussed earlier, if a charger may provide a fixed charging signal of 1 ampere (A), then the charger could provide the charging signal to two merchandise times that each take one half ampere (½ A) of charging current. During the next time period the charger could provide the charging signal to three merchandise times that each take one third ampere (⅓ A) of charging current.

The method 700 may include connecting one of the merchandise items to a corresponding tether. When a merchandise item is connected to a tether, the charging can include charging the merchandise items connected to the tether through a wire in the corresponding tether.

To save power, the method 700 may determine which merchandise items actually require charging and those that do not and then charge only those items requiring charging. Also, the method 700 can connect the merchandise items to corresponding ports of a switch box. To save further power, the method 700 then determines which ports of the switch box are connected to the merchandise items and which ports not connected to the merchandise items. The charging, at 704, then can include providing charging current to ports connected to merchandise items on a multiplexed basis and not providing current to ports not connected to merchandise items.

The method 700 can also include providing a product information device configured to provide video content and audio content at the display associated with the merchandise items. A first power source can be provided to provide power to the product information device. A second power source can be provided to provide power to the merchandise items. The method can then generate an alarm when either the first power source or the second power source loses power. The alarm is not generated when both the first power source and the second power source lose power. This is because a thief is likely to deactivate one power supply at a time, not both. Also, during power loss to a whole building were the display is located, such as during severe weather, both power supplies will be lost due to an act of nature so an alarm is not generated.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising:
   determining which ports of a switch box are connected to the merchandise items and ports of the switch box are not connected to the merchandise items;

determining which of a plurality of merchandise items require charging, wherein the merchandise items are located at a display that permits the merchandise items to be handled;

charging the plurality of merchandise items that were determined to require charging, wherein the charging the plurality of merchandise items further comprises providing a charging current to ports of the switch box connected to merchandise items on a multiplexed basis and not providing charging current to ports not connected to merchandise items; and generating an alarm when one of the merchandise items is removed from the consumer display.

2. The method of claim 1 further comprising:
detecting when one of the plurality of merchandise items is being handled by the consumer; and
providing product information about the one of the plurality of merchandise items being handled by the consumer.

3. The method of claim 1 further comprising:
connecting a tether between at least one of the plurality of merchandise items and a first power source; and
charging the merchandise item connected to the tether through the tether.

4. The method of claim 3 further comprising:
detecting when the tether is removed from the one of the plurality of merchandise items; and
generating an alarm when the tether is severed or when the tether is removed from the one of the plurality of merchandise items.

5. The method of claim 1 further comprising:
charging a portion of the consumer display that does not include the plurality of merchandise items with a first power source;
charging the plurality of merchandise items at the display with a second power source; and
generating an alarm when one of the first power source and the second power source loses power, wherein the alarm is not generated when both the first power source and the second power source lose power.

6. The method of claim 5 wherein the charging a portion of the consumer display that does not include the plurality of merchandise items further comprises:
charging a video display.

7. The method of claim 1 further comprising:
connecting one of the plurality of merchandise items to a corresponding tether and wherein charging the plurality of merchandise items further comprises:
charging at least one of the merchandise items connected to the tether through a wire in the corresponding tether.

8. The method of claim 1 further comprising:
detecting one of the plurality of merchandise items has been moved more than a predetermined distance from the display; and
sending an alarm when one of the plurality of merchandise items has been moved more than the predetermined distance from the consumer display.

9. The method of claim 1 further comprising:
determining which of the plurality of merchandise items have a battery voltage that has dropped below a threshold value; and
charging the plurality of merchandise items with battery voltages that have dropped below the threshold value.

10. The method of claim 9 wherein the charging further comprises:
charging the plurality of merchandise items with battery voltages that have dropped below the threshold value on a round robin basis.

11. The method of claim 9 further comprising:
connecting tethers between the merchandise items and a power supply; and
supplying power from the power supply through the tethers to the plurality of merchandise items with battery voltages that have dropped below the threshold value.

12. The method of claim 3 wherein generating the alarm further comprises:
not generating an alarm when all of the merchandise items lose power.

13. The method of claim 9 further comprising:
charging the plurality of merchandise items with battery voltages that have dropped below the threshold value on a multiplexed basis with equal time periods of charging.

14. The method of claim 1 further comprising:
detecting a wireless deactivation key; and
deactivating the alarm when detecting the wireless deactivation key.

15. The method of claim 14 wherein the detecting a wireless deactivation key further comprises:
reading data from the wireless deactivation key and determining the data belongs to an authorized user.

16. The method of claim 1 further comprising:
counting how many times one or more of the merchandise items is handled.

17. An apparatus for charging merchandise items comprising:
a switch box having ports that connect to merchandise items, the apparatus being configured to determine which ports of a switch box are connected to the merchandise items and ports of the switch box are not connected to the merchandise items;
a monitoring and alarm device configured to determine which of a plurality of merchandise items at a merchandise display require charging, wherein the monitoring an alarm device is configured to generate an alarm when one of the merchandise items is moved a predetermined distance away from the merchandise display; and
a charger configured to charge merchandise items the monitoring and alarm device determined require charging, wherein the charge is further configured to provide a charging current to ports of the switch box connected to merchandise items on a multiplexed basis and to not provide a charging current to ports of the switch box not connected to merchandise items.

18. The apparatus for charging merchandise items of claim 17 wherein the monitoring and alarm device is configured to detect that a merchandise item requires charging when a voltage of the merchandise item crosses a threshold voltage value.

19. The apparatus for charging merchandise items of claim 17 wherein the charger further comprises:
a multiplexer configured to charge the merchandise items that require charging, wherein the multiplexer is further configured to perform the charging on a multiplexed basis.

* * * * *